Feb. 4, 1941.  C. J. FITCH  2,230,679
SIGNALING SYSTEM
Filed Nov. 10, 1938   3 Sheets-Sheet 1

INVENTOR
Clyde J. Fitch
BY
ATTORNEY

Feb. 4, 1941. C. J. FITCH 2,230,679
SIGNALING SYSTEM
Filed Nov. 10, 1938 3 Sheets-Sheet 2

INVENTOR
Clyde J. Fitch
BY
ATTORNEY

Feb. 4, 1941.   C. J. FITCH   2,230,679
SIGNALING SYSTEM
Filed Nov. 10, 1938   3 Sheets-Sheet 3
FIG. 4.
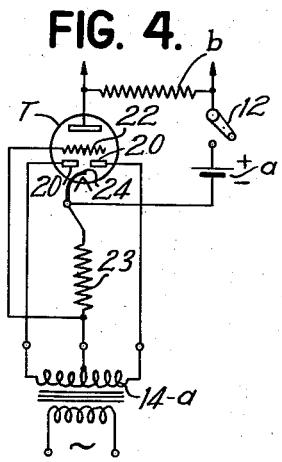
FIG. 5.
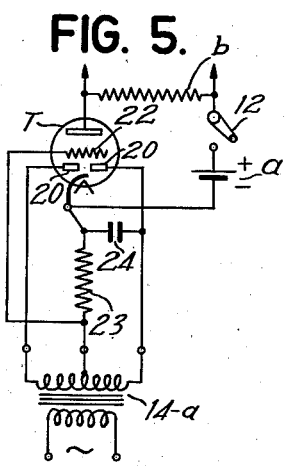
FIG. 6.
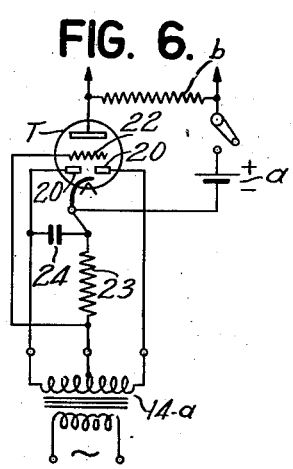
FIG. 7.
FIG. 8.
FIG. 9.
FIG. 10.
FIG. 11.
FIG. 12.
FIG. 13.
FIG. 14.
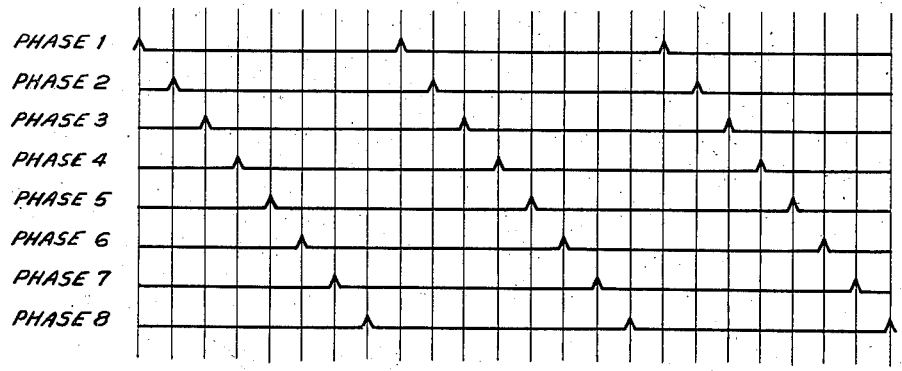
INVENTOR
Clyde J. Fitch
BY
ATTORNEY Patented Feb. 4, 1941

2,230,679

UNITED STATES PATENT OFFICE 2,230,679

SIGNALING SYSTEM

Clyde J. Fitch, Endicott, N. Y., assignor to International Business Machines Corporation, New York, N. Y., a corporation of New York Application November 10, 1938, Serial No. 239,838

12 Claims. (Cl. 178—51)

This invention relates to signaling systems and more particularly to a system for operating remotely situated signaling channels in timed relationship.

The instant application constitutes an improvement over the signaling system described in the copending application, Serial No. 756,443, filed December 7, 1934, wherein said copending application a plurality of normally non-conductive signaling channels are provided at a transmitting and receiving station; each channel including an electric discharge device, and wherein individual sources of fluctuating voltages are transformed into polyphase voltages which at each station are impressed upon the signaling channels for conditioning the channels periodically and cyclically at mutually exclusive intervals for control purposes. Signal initiating and indicating means are described in detail in the said copending application, and are shown to control selectively the signaling channels at the transmitting station to render them conductive upon operation of the signal initiating means for initiating code combinations of control signals which are effective to render the receiving signaling channels conductive in accordance with the receipt of the signals for controlling selectively the signal indicating means. It was mentioned that individual sources of voltages are provided for conditioning the signaling channels and assumed that the said remotely situated sources of voltages are obtained from synchronous distribution systems.

It is known that for certain applications that such synchronous sources of voltages are not available and that therefore, additional provisions must be made for controlling the synchronous conditioning of the said signaling channels. It is now proposed that the transmitting station control the synchronous conditioning of the signaling channels at both stations.

To this end, certain of the available signaling channels are employed for synchronizing purposes, thus, at the transmitting station a predetermined number of the signaling channels are normally maintained non-conductive and disconnected from the transmission medium for signal control purposes as described in the said copending application, and that, for example, a single signaling channel is connected at all times to the transmission medium so that, upon the periodic and cyclic conditioning of the last mentioned channel, periodic synchronizing signals are impressed continuously upon the transmission medium. In this manner, the normally nonconductive channels are selectively rendered conductive in accordance with the operation of the signal initiating means for initiating aperiodically timed control signals, and the selected channel for synchronizing control purposes is effective continuously for initiating periodic synchronizing signals. At the receiving station, corresponding signaling channels are provided which normally are nonconductive, and which are conditioned periodically and cyclically in synchronism with the conditioned signaling channels at the transmitting station. Upon receipt of the timed signals, initiated upon operation of the signal initiating means, such signals are properly segregated and effective to render the corresponding signaling channels conductive at the receiving station which, in turn, are effective to control the associated signal indicating means. A corresponding synchronizing signal channel is provided at the receiving station to be responsive to the periodic synchronizing impulses which upon receipt thereof are effective for controlling the conditioning of the signaling channels at this station.

At each of the stations an independent fluctuating supply source is provided in the form of an oscillation generator adapted to produce oscillations of a predetermined frequency. In the instant application the oscillation generators referred to are shown in the form of electronic oscillation generators, it is understood that other forms of generators of fluctuating power supplies may be employed if desired. Provision is made whereby the oscillation generators referred to are controlled and excited by the periodic synchronizing signals. Therefore, it will be seen that the synchronizing channel at the transmitting station is adapted to be conditioned by the electronic oscillation generator thereat so as to be conductive at periodic intervals to initiate synchronizing signals at such intervals and that the synchronizing signals are effective in turn to sustain further generation of the oscillations produced by the electronic oscillation generator thereat. Receipt of the periodic synchronizing signals at the receiving station is effective to excite the oscillation generator provided thereat which in turn is then effective to generate oscillations of a frequency corresponding to that of the oscillations generated at the transmitting station which in turn are then impressed upon the individual signaling channels including the synchronizing channel to condition these channels and control the conductivity thereof. It will be seen that the synchronizing channel is rendered conductive periodically to sustain further generation of the oscillations at the receiving station. In this manner, it is possible to provide a signaling system which is self-contained and which can be operated in synchronous relationship irrespective of the normal power sources.

Therefore, an object of the present invention resides in the provision of normally non-conductive signaling channels at a plurality of stations and providing at the stations suitable oscillation generators which are adapted to condition the signaling channels periodically and cyclically at mutually exclusive intervals for various control purposes, and in addition thereto, to provide at each station a synchronizing channel for initiating periodic control signal impulses for exciting the oscillation generators, thus sustaining further generation of the predetermined oscillations conditioning the signaling channels.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

Figs. 4, 5, and 6 show various forms of impulse generators which may be employed in the present signaling system.

Figs. 7-13 show the voltage wave shapes impressed on various sections of the control circuits.

Fig. 14 shows graphically the developed phase displaced impulses representing the differential times at which the electric discharge devices at both the transmitting and receiving stations are rendered conductive.

GENERAL DESCRIPTION

Figure 1:
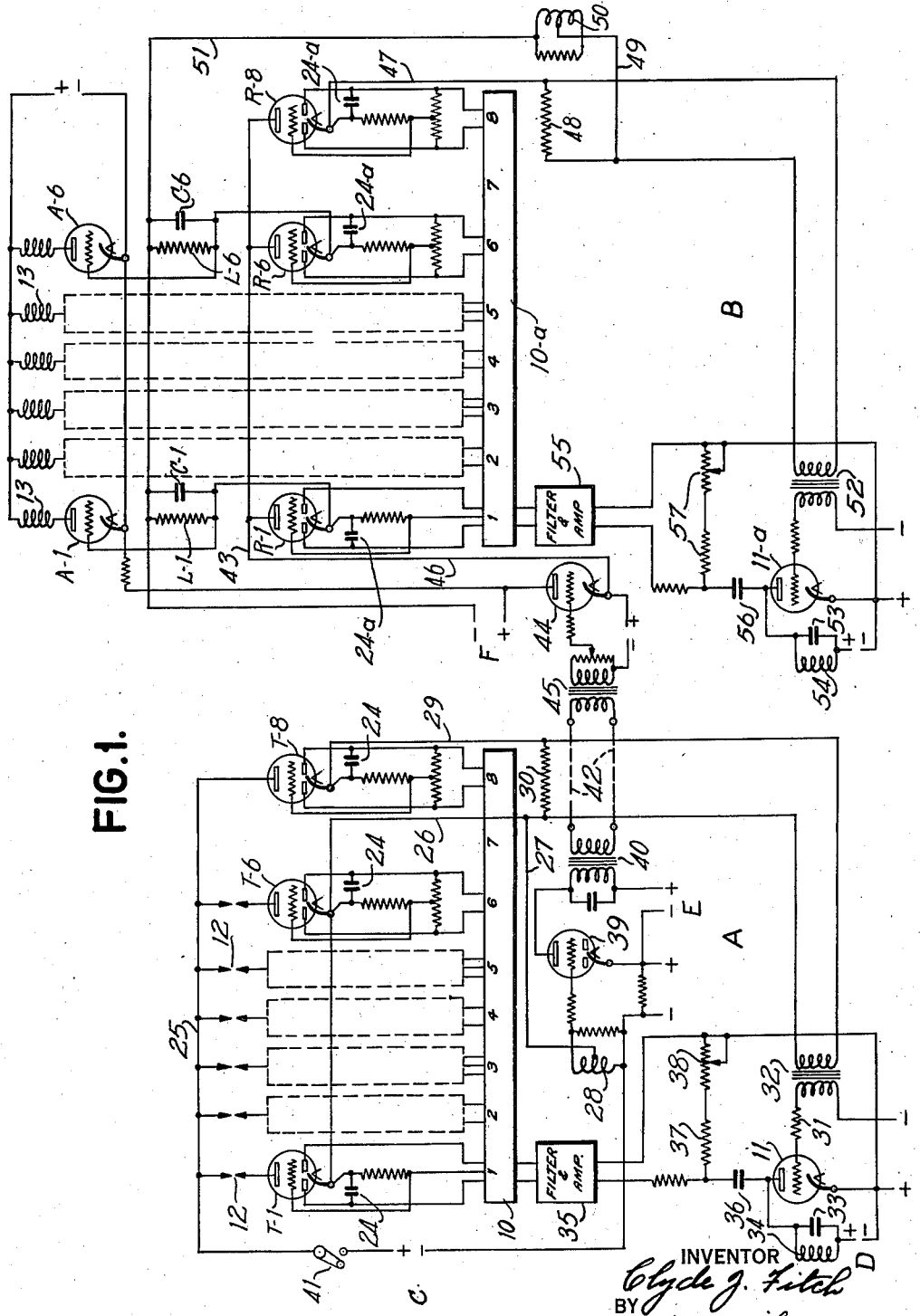
Fig. 1 is a circuit diagram showing diagrammatically the circuit arrangement of the signaling and synchronizing channels of the transmitting and receiving stations.

Referring now to Fig. 1, the signaling system shows and comprises a plurality of signaling channels including electric discharge devices T—1 to T—8 and R—1 to R—8 at the transmitting and receiving stations designated A and B, respectively. The series of electric discharge devices are shown associated with the phase-splitting transforming means generally indicated by the reference characters 10 and 10—a which, for the instant application, are similar in design and shown in detail in Fig. 2. Individual sources of fluctuating power are impressed upon the phase-splitting transforming means which are effective to generate phase displaced voltages which, in turn, are impressed upon the associated electric discharge devices. The said discharge devices at both the transmitting and receiving stations are conditioned for controlling purposes by the fluctuating power supply periodically and cyclically at mutually exclusive intervals. The power supplies referred to are generated by the electronic oscillation generator systems which are indicated generally in the figure by the reference characters 11 and 11—a, designating the electric discharge devices and the associated circuits which are adapted to generate oscillations of a predetermined frequency. The oscillation generator systems at both the transmitting and receiving stations are similar in design, therefore, hereinafter it will be sufficient to explain in detail the circuit arrangement and operation of only one of these systems. The electric discharge devices at the transmitting station are rendered conductive selectively upon operation of the signal initiating means generally indicated by the reference character 12. It is sufficient to mention that the signal initiating means 12 may be operated singly or simultaneously in different code combinations for initiating code combinations of the signaling impulses. Devices for controlling the signal initiating means in selective combinations are well known in the art and since these devices per se form no part of the invention, further description thereof is deemed unnecessary. However, reference may be made to the above-mentioned application or to the copending application, Serial No. 113,798, filed December 2, 1936, wherein methods of conditioning and controlling the signaling initiating means is shown and described in detail.

It is to be noted that normally the signal initiating means 12 maintain the electric discharge devices T—1 to T—6 disconnected from the transmitting circuit arrangement whereas the synchronizing channel including the electric discharge device T—8 is at all times connected thereto for impressing continuously thereon the periodic synchronizing impulses. It is also to be noted that the synchronizing channel is effective at all times to impress the initiated periodic synchronizing signals upon the associated oscillation generator generally designated by the reference character 11, in this manner, sustaining further generation of the oscillations which in turn are effective for controlling the conditioning of the signaling channels.

At the receiving station the devices R—1 to R—6 are rendered conductive in accordance with the control signals received for controlling the energization of the signal indicating control means indicated generally by the reference character 13. Such signal indicating means controlled by the single or combinations of signals are well known in the art, and need not be disclosed in detail; however, reference is made to the above mentioned copending application or the copending application Serial No. 178,016, filed December 4, 1937, wherein methods of conditioning and controlling signal indicating means are shown and described in detail. The synchronizing channel at the receiving station including the electric discharge device R—8 is controlled continuously at periodic intervals by the received synchronizing signals for controlling the energization or excitation of the associated oscillation generator generally indicated by the reference character 11—a. The oscillations generated thereby are of the same frequency as the generated oscillations at the transmitting station, and are in synchronism therewith so that when the said oscillations are impressed upon the signaling channels at the receiving station these channels are conditioned periodically and cyclically at the same intervals that the corresponding channels of the transmitting station are conditioned. Thus, it will be seen that the initiated periodic synchronizing signals are effective to control the excitation of the oscillation generators at both stations, in this manner maintaining synchronous operation of the oscillation generators and, of course, in turn maintaining synchronous conditioning and operation of the associated signaling channels of the transmitting and receiving stations.

Phase transforming means

Figure 2:
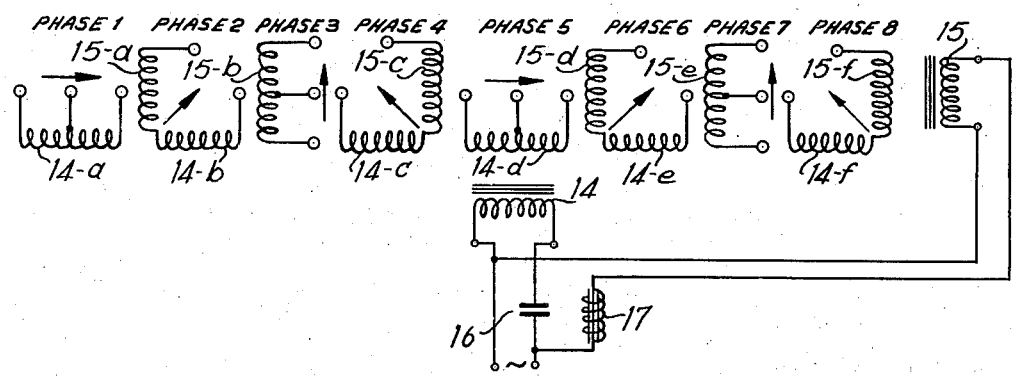
Fig. 2 shows diagrammatically one form of a phase-splitting device which may be employed at the transmitting and receiving stations.

Referring now to Fig. 2, the phase transforming means associated with the signaling channels which may be employed at both the transmitting and receiving stations will now be described.

The phase transforming means is shown to comprise two primary windings 14 and 15 and the associated secondary windings 14—a to 14—f and 15—a to 15—f, respectively. In the circuit including the primary winding 14, a condenser 16 is included, and in the circuit including the primary winding 15, an inductance 17 is inserted, and the values of the condenser and inductance are chosen so that the voltages in the said primary windings are ninety degrees out of phase, the voltage across each primary winding being the same. It is to be noted that the turns ratio of some of the individual secondary windings vary so that the voltages across the said windings vary accordingly. For example, the secondary windings associated with the primary winding 14 comprises two windings 14—a and 14—d of voltages E and four windings 14—b, 14—c, 14—e, 14—f of voltages equal to $\frac{1}{2}\sqrt{2}\ E$. The secondary windings 15—a to 15—f associated with the primary winding 15 are similarly rated and therefore when connected as shown in the figure, the output voltages of the connected secondary windings are all of equal values. It is evident from the description thus far, and from the circuit arrangement shown in the figure, that four different phases, equally spaced electrically, namely, forty-five degrees apart, are developed. The phase directions vectorially are shown by the arrows for each of the phases in the said figure. It is to be noted that eight secondary outputs are provided and for this reason, the output circuits of the secondary windings are arranged in pairs. Thus, two circuits each are provided upon which the same phases are impressed, such as the circuits indicated by the designations, phase 1 and phase 5, or those designated phase 3 and phase 7. The purpose of this arrangement will be understood as the description progresses.

Channel conductivity controlling means

Referring now to Figs. 4, 5, and 6, the operation of an individual electric discharge device and the associated circuits which may be connected to any one of the secondary output circuits of the said phase transforming means will now be described, and is shown to comprise an electric discharge device T equivalent to a full wave rectifier and triode in one envelope and which is well known in the art, commonly referred to as a "duplex diode triode type." The diode plates 20 are joined to the terminals of any one of the said secondary windings of the phase transforming means, in the example chosen, indicated at 14—a, the center tap of which is connected to the grid control element 22 of the device T, and by means of the resistor 23 is also joined to the cathode element 24 thereof. It is evident from this description that normally the grid element of the device is at zero bias, since no current is impressed upon resistor 23, therefore, upon closure of the signal initiating means shown as the contacts 12, a momentary current flow is established in the triode plate circuit as follows: From the positive terminal of the battery a to the resistor b, anode and cathode elements of the device T, to the negative terminal of the said battery. This described condition exists in the circuit for only a comparatively short time because the bias of grid 22 remains no longer at zero value, and is not a constant factor but varies in a timed relationship with the frequency of the fluctuating supply source. The said supply source by means of the windings 14—a is impressed upon the full wave rectifier section of the device and the rectified voltage impressed upon resistor 23 immediately drives the grid bias negative with respect to the cathode. The value of the resistor 23 is adjusted so that before the grid bias becomes effective to reduce the plate current to substantially zero value, a pulse is impressed upon the output circuit just traced so that a short signal impulse is impressed upon the output circuit associated with the resistor b. It is understood now that as the signal initiating means 12 is maintained in an operative position the device T is rendered conductive periodically so that a series of short equally spaced impulses will be continuously impressed upon the said output circuit and that the frequency of the initiating signals is twice the frequency of the fluctuating supply source. Referring to Figs. 7–9 the voltage wave forms impressed upon different sections of the circuit are shown; Fig. 7 represents the sinusoidal wave shape of the voltage impulses impressed upon the diode plates 20 of the device; Fig. 8 represents the rectified wave forms impressed on the resistor 23, and the wave form shown in Fig. 9 represents the impulses generated and impressed upon the output circuit of the devices each time the said device is rendered conductive which as described is at those times that the said voltage supply passes through zero value.

Referring now to Fig. 5, the electric discharge device T and the associated circuits are shown similarly arranged as shown and described in connection with Fig. 4 with the exception of the additional provision of the condenser 24 connected between one of the diode plates 20 of the device and the associated cathode. It is evident now from the description just set forth that the grid element 22 of the device is at zero bias when the fluctuating supply impressed in the secondary winding 14—a passes through zero due to the fact that no current is passing through the resistor 23. It is at such periods that the device is conditioned to be conductive thereby permitting current to flow in the associated output circuit. The effect of the condenser 24 as shown in Fig. 5 will now be described. When the polarity is such that current passes from the diode plate 20 connected to the condenser 24 to cathode, this current passes through the resistor 23 and also charges the condenser 24 to the polarity as shown. At the end of this particular half cycle as the current passes through zero, the charge in the condenser maintains the grid of the device negative with respect to the cathode and is of such value as to be sufficient to permit no plate current to flow. The charge in the condenser leaks off through the resistor 23, the value of the capacitor and resistor being such that the time constant of the circuit is adjusted so as to maintain the device non-conductive during the timed interval that the said half cycle of the power supply passes through zero, and during part of the following half cycle until the current passing from the other diode plate 20 to the capacitor and through resistor 23 has reached sufficient amplitude to maintain the device biased so as to be maintained non-conductive. At the end of the second half cycle the charge in condenser 24 has completely leaked off, and as the said half cycle passes through zero the grid bias is zero thereby permitting the device to be rendered conductive momentarily. Thus, it is seen, that during the transition period during the first and second half cycle, the device is continuously rendered non-conductive, and during the transition period between the second and third half cycles, the condenser having received no charge during the second half cycle, or if any charge, is in the opposite phase thereby having no effect upon the bias and thus permitting the device to be conductive as the fluctuating supply voltage passes through zero. The curve shown in Fig. 10 shows the wave shapes of the rectified voltage across the resistor 23 in the circuit arrangement shown in Fig. 5. The effect of the condenser 24 is evident, namely, suppressing the alternate peaks of the rectified waves as shown, and as just explained, the suppressed waves are effective to maintain the bias of the device such so as to render the device non-conductive, whereas the unsuppressed waves are effective to render the device conductive. Thus it is seen, that the device is rendered conductive one time for each complete cycle of the fluctuating power supply impressed thereupon, whereas without the condenser the said device would be rendered conductive two times during a complete cycle of a fluctuating power supply.

In Fig. 11, the impulses indicated therein are representative of the periods at which the device shown in Fig. 5 is rendered conductive and the short current impulses flowing in the output circuit of the device at such times, which is seen from the figure, occurs at equally spaced timed intervals. Now assume that the condenser 24 is connected in the diode plate circuit opposite to that shown in Fig. 5, for example, as shown in Fig. 6, between the cathode and the other diode plate 20. With the condenser inserted in the circuit as shown in Fig. 6 it is obvious that the opposite peaks of the rectified wave forms will be suppressed and render the tube non-conductive. In Figs. 12 and 13 the wave forms are shown when the condenser 24 is included in the circuit as it is shown in Fig. 6. It is seen that the opposite peaks of the rectified waves are suppressed to render the device non-conductive at those particular intervals. The impulses represented in Figs. 11 and 13 indicate comparatively the timed intervals during which the device T is rendered conductive depending upon which diode plate circuit the condenser 24 is inserted therein.

It is now understood that by inserting the condensers in the opposite legs of the diode plate circuits and impressing fluctuating supply sources which are in phase, or of the same phase, upon the discharge devices that two different and separate signal generating circuits are obtained for initiating two series of equally spaced impulses, said series of impulses being separated 180° electrically.

Figure 3:
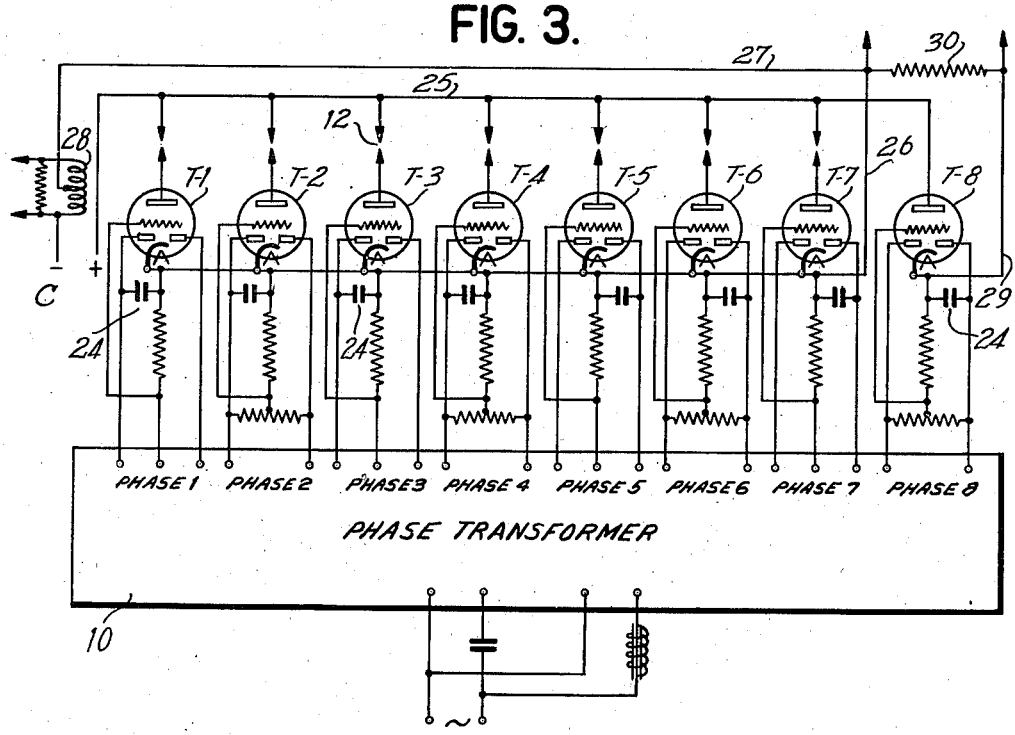
Fig. 3 shows diagrammatically the individual conductivity control means for the signaling channels at the transmitting station.

Referring now to Fig. 3, the individual electric discharge devices T—1 to T—8 are shown connected to the individual output circuits of the phase transforming means 10 designated phase 1 to phase 8. It is noted that the condensers 24 associated with the devices T—1 to T—4 are connected in one leg of the individual diode plate circuits thereof and for the devices T—5 to T—8 are connected in the opposite legs of the diode plate circuits. It was mentioned that pairs of similar or like phases of the voltage sources are developed, for example, phases 1 and 5 are shown vectorially to be in the same direction. Therefore, by connecting the individual electric discharge devices and the associated circuits as described to the individual secondary output circuit of the phase transforming means for example to phases 1 and 5 and having the condensers 24 connected in the opposite legs of the diode plate circuits as shown, it is understood that the devices T—1 and T—5 are rendered conductive at such intervals to initiate series of control impulses diametrically opposite in phase, that is, 180 electrical degrees apart, as shown in Fig. 14.

Thus, it will be understood without further detailed description, that with the four different phases developed by the phase transforming means and a twin or double set of secondary circuits, and by connecting the electric discharge devices and the associated circuits thereto, and connecting the condensers 24 inversely in the twin secondary circuits, that eight separate signal generating circuits are obtained to generate eight differently timed signal pulses for control purposes, said pulses being spaced or separated 45° electrically.

The signal initiating means 12 are shown connected to the anodes of the devices T—1 to T—7 and the common conductor 25, so that upon operation thereof the associated devices are rendered conductive to initiate the timed signal impulses and effect energization of the following circuit at the various timed intervals; from the positive terminal of the power supply designated C, to the conductor 25, anodes and cathodes of the devices T—1 to T—7, conductors 26 and 27, coil 28 to the negative terminal of the said power supply.

It is seen that the anode element of the device T—8 is connected directly to the conductor 25 so that whenever the said device is conditioned by the voltage source impressed thereon by means of the secondary output circuit designated phase 8, the said device is rendered conductive at periodic intervals continuously thereby permitting current to flow in the following circuit: from the positive terminal of the power supply C, to conductor 25, anode and cathode elements of device T—8, conductor 29, resistor 30, conductor 27 and coil 28 to the negative terminal of the said supply C. In the event that all the signal initiating means 12 are closed at the same time for initiating the control impulses, the arrangement of the pulses as viewed by a cathode ray oscillograph for example, would be substantially as shown in Fig. 14, of course, all the impulses would be seen on the same axis or plane, whereas in the figure, for the sake of clarity, each of the series of control impulses is shown in separate planes.

Oscillation generator

The oscillation generators shown in Figs. 1, and employed in the transmitting and receiving circuits are similar to the oscillator circuit fully shown and described in detail in the copending application Serial No. 100,070, filed September 10, 1936. Therefore, the following brief description of the oscillation generator circuits employed in the instant application is deemed sufficient. The operation of the oscillation generator circuit employed in the receiving circuit arrangement is identical to the operation of the generator in the transmitting circuit arrangement which will now be described.

The grid element of the oscillator control tube 11 is shown connected to the resistor 31 and the secondary winding of the transformer 32 which, in turn, is connected to a negative potential so that the control tube 11 is normally biased and conditioned so that no plate current is flowing in the output circuit thereof. Connected to the plate of tube 11 is a tuned circuit arrangement comprising capacitance 33 and inductance 34. The primary winding of the transformer 32 is connected in shunt relationship to resistor 30. Assuming, now for the moment that periodic control impulses are impressed upon the resistor 30 and are of such value as to overcome the bias of tube 11, thereby permitting, whenever the pulses are impressed upon the resistor 30, current to flow from the positive terminal of the potential source designated D through the said tuned circuit arrangement to the anode and cathode elements of the tube 11 to the negative terminal of the said source. The current flow established through the tuned circuit causes excitation thereof at a frequency depending upon the LC constants of the oscillatory circuit. The oscillatory circuit just described is shown coupled to any suitable amplifier and filter arrangement generally designated by the reference character 35 by means of the coupling condenser 36 and resistors 37 and 38, so that the oscillations generated by the said tuned circuit are impressed upon the amplifier and filter arrangement through the said coupling condenser and resistors. The coupling means, just referred to, which is inserted between the tuned circuit and the input of the amplifier arrangement 35 also is suitable as a phase shifting means. Different adjustments of the phase shifting may be effected and varied slightly by means of adjusting the resistor 38 referred to. The generated oscillations are then amplified by any suitable arrangement designated 35 which may also incorporate a suitable filter which is used merely for the purpose of filtering out the higher harmonics in delivering a pure sine wave the output of the filter. The amplified oscillations are then impressed upon the phase transforming means 10 which as described hereinabove is then effective to transform the voltage input into a multi-phase voltage supply source. For further descriptive details of this oscillation circuit, reference may be made to the last-mentioned copending application.

*Transmitting circuit arrangement*

Referring now to Fig. 1, the operation of the signal generating and transmitting circuits will now be understood.

The individual signaling channels including the electric discharge devices T—1 to T—6 are connected to the individual output circuits of the phase transforming means 10, several circuits of which are shown in detail in Fig. 1. The signal initiating means 12 included in the individual signaling channels are connected in common to the conductor 25 and the individual plates of the devices T—1 to T—6. As mentioned hereinabove, the signal initiating means 12 may be operated singly or in different code combinations by the mechanisms referred to in the first-mentioned copending application for controlling the conductivity of the individual signaling channels associated therewith. Upon operation of any of the signal initiating means 12 equally spaced time signals will be initiated. The timing of the out-of-phase control signals with respect to each other is controlled by the phase displaced voltages impressed upon the input circuits of the electric discharge devices. The signaling channels just referred to relate to those associated with phases 1 to 6 of the phase transforming means 10. In Fig. 1, phase 7 is not shown to be included in the transmitting and receiving circuits. This phase may be used for other controlling purposes not relevant to the present invention. Phase 8 of the phase transforming means 10 shown connected to a signaling channel which will be referred to hereinafter as the synchronizing control channel and is shown to include the electric discharge device T—8, is shown to be connected directly to the common conductor 25. The cathode element of the device T—8 is connected by means of the conductor 29 to one terminal of the resistor 30. The cathode elements of the devices T—1 to T—6 are connected in common by the conductor 26 to the other terminal of the said resistor 30 and also by means of the conductor 27 is extended to an output circuit comprising the control tube 39 and output transformer 40. The control tube 39 is adapted to be biased so that normally no plate current is flowing in the output circuit thereof including the primary winding of the transformer 40.

Assume now, that the control switch 41 is closed and that the signal initiating means 12 remain unoperated for the moment, current flow is immediately established through the synchronizing control channel as follows: from the positive terminal of supply source C, through conductor 25 to the anode and cathode elements of the device T—8, conductor 29, resistor 30, conductor 27, coil 28 to the negative terminal of the said source. This momentary flow of current is effective to reduce the grid bias impressed upon the control tube 39 so that current flow is now established in the output circuit thereof as follows: from the positive terminal of the potential supply source E, through the tuned circuit arrangement including the primary winding of transformer 40 to the anode and cathode elements of the said tube to the negative terminal of the said supply source, thus, impressing upon the transmission medium generally designated 42 associated with the secondary winding of the transformer 40 a control signal which will be identified as the synchronizing control signal. The voltage drop across the resistor 30 is also effective to reduce the grid bias of the tube 11 of the oscillator circuit permitting this tube in turn to be conductive and as described hereinbefore excite the associated tuned circuit arrangement comprising the condenser 33 and the inductance 34 to initiate oscillations of a predetermined frequency which are then, in turn, impressed upon the amplifier arrangement 35 and in turn impressed upon the input circuit to the phase transforming means 10. Immediately upon impressing the oscillations upon the phase transforming means, the device T—8 is rendered non-conductive except at those periods when the voltage impressed upon the said device passes through zero and due to the insertion of the condenser 24 in one leg of the diode plate circuit thereof, the device T—8 is rendered conductive only one time for each complete cycle of the voltage supply. Immediately upon building up of the voltage supply source by means of the excited oscillator generator circuit, impulses are generated by the synchronizing channel including the device T—8 at the rate of one impulse for each cycle, which impulses are then impressed upon the resistor 30 for periodically controlling the operation of the oscillator control tube 11 which, in turn, controls the excitation of the associated tuned circuit thereby sustaining further generation of the oscillations which are impressed upon the phase transforming means and, secondly, for controlling the conductivity of the control tube 39 thereby impressing periodically synchronizing control signals upon the transmission medium 42 associated with the secondary winding of the transformer 40. In this manner, it is seen that the synchronizing channel is rendered conductive periodically for continuously controlling the excitation of the oscillator circuit and for continuously impressing periodically at intervals synchronizing impulses upon the transmission medium. The generated oscillations which are impressed upon the phase transforming means 10 are effective to control the conditioning of the signaling channels including the devices T—1 to T—6 for controlling the conductivity of these channels whenever the signaling initiating means 12 associated therewith are operated. It was mentioned hereinabove that the signal initiating means 12 may be operated either singly or in various code combinations to render the associated signaling channels conductive to initiate at periodic intervals the variably timed control signals.

It is seen that upon operation of the signal initiating means 12, the various character signals are impressed upon the common conductor 26 and upon the conductor 27 to control the conductivity of the control tube 39 which, in turn, is effective to impress control signals upon the output transformer 40 and the connected transmission medium 42. The circuits controlled by the control signals initiated by the signaling and synchronizing channels will now be described.

*Receiving circuit arrangement*

Referring now to Fig. 1, the operation of the receiving circuit will be described briefly. The individual receiving signaling channels including the electric discharge devices R—1 to R—6 and the synchronizing channel including the device R—8 are shown connected to the individual output circuits of the phase transforming means 10—a, several circuits of which are shown in detail. The said phase transforming means corresponds exactly to the phase transforming means 10 and is adapted by means of the polyphase voltages developed thereby to control the conditioning of the connected circuits including the devices R—1 to R—8 in exactly the same manner as the devices T—1 to T—8 are conditioned for controlling the conductivity thereof, therefore it is deemed unnecessary to repeat this description at this time.

The plates of the triode elements of the devices R—1 to R—8 are connected in common to the conductor 43 and the cathode element of the control tube 44, the grid element of which is shown connected to the secondary winding of the receiving transformer 45 and a suitable source of negative potential so that normally this tube is biased to be non-conductive during the intervals that no signals are impressed upon the transmission medium 42 which is shown connected to the primary winding of the said transformer 45.

The individual electric discharge devices R—1 to R—6 are shown to be associated with the individual condenser units C—1 to C—6 which in turn are adapted to control the grid circuits of the associated tubes A—1 to A—6. The selective controlling of these circuits will be explained later herein, however, it should be mentioned that the tubes A—1 to A—6 are normally biased so that they remain non-conductive and in this manner maintain the signal indicating control means 13 deenergized until such times when the particular control signals are received and impressed upon the receiving circuit arrangement. As mentioned hereinbefore, the signal indicating control means may be controlled singly or in various code combinations.

Now assume that at the transmitting station, the switch 41 is closed and the signal initiating means 12 remain unoperated so that the devices T—1 to T—6 remain non-conductive, it is understood that a plurality of periodic synchronizing impulses are initiated by the synchronizing channel including the device T—8 and impressed upon the transmission medium 42.

The synchronizing signals received at the receiving station are then impressed upon the control tube 44 to render this tube conductive whenever the said signals are impressed upon the grid element thereof. It is now seen that for each synchronizing impulse received the tube 44 is rendered conductive momentarily permitting current to flow through the following circuit: from the positive terminal of the potential source F, anode and cathode elements of tube 44, conductor 46, anode and cathode elements of the triode section of the device R—8 (at this moment the grid element thereof is a zero bias, thus permitting the device to be conductive), conductor 47, resistor 48, conductor 49, coil 50, and conductor 51 to the negative terminal of the said source. Energization of the resistor 48 is effective to overcome the grid bias on the oscillator control tube 11—a, due to the voltage drop across the said resistor which is impressed upon the grid element of the oscillator control tube by means of the transformer 52. The control tube 11—a is rendered conductive momentarily to excite the associated tuned circuit arrangement comprising the capacitance 53 and inductance 54. The generated oscillations, the frequency of which is adapted to be the same as the frequency of the oscillations generated at the transmitting station, are then impressed upon the filter and amplifying arrangement generally designated 55 by means of the coupling condenser 56 and resistors 57, and in turn are then impressed upon the input circuit of the phase transforming means 10—a. It is understood now, that immediately upon impressing the oscillations upon the phase transforming means, the device R—8 is conditioned so as to be non-conductive except at those periods when the voltage impressed upon the said device passes through zero and due to the insertion of the condenser 24—a in the one leg of the diode plate circuit thereof, the device R—8 is rendered conductive only one time for each complete cycle of the voltage supply. Immediately upon building up of the voltage supply source by means of the excited oscillator generator circuit, impulses are generated by the synchronizing channel including the device R—8 at the rate of one impulse for each cycle, which impulses are then impressed upon the resistor 48 for periodically controlling the operation of the oscillator control tube 11—a which in turn, controls the excitation of the associated tuned circuit thereby sustaining further generation of the oscillations which are impressed upon the phase transforming means. The operation of the synchronizing and oscillator circuits just described is exactly the same as the operation of the synchronizing and oscillator circuits employed at the transmitting station and described in detail hereinabove.

It is evident now that the synchronizing and oscillator circuits at both stations are operated in exact synchronism. The reason for this is obvious, since the periodic synchronizing signals initiated at the transmitting station control the periodic operation of the oscillator circuits at both staions. It also follows that the devices T—8 and R—8 included in the synchronizing channels are rendered conductive at the same intervals since the voltages impressed upon the individual circuits are of the same phase, or stated in other words, are in phase. The impulses developed in Fig. 14 for phase 8 represent the periodic intervals at which the devices T—8 and R—8 are rendered conductive. The frequency at which these devices are rendered conductive depends solely upon the predetermined frequency of the oscillations generated by the described oscillator circuits.

It should be mentioned that upon initial conditioning of the receiving circuits, that is, upon conditioning the system with the synchronizing signals, before initiation of the character signals, that as soon as the first synchronizing signal is impressed upon the receiving circuit arrangement not only is the synchronizing channel rendered conductive momentarily, but similarly are the other signaling channels associated with phases 1 to 6 and including the devices R—1 to R—6. However, the individual signal receiving channels can be so arranged that the momentary period of conductivity of these channels effects no faulty operation of the associated signal indicating control means. This can be effected by selecting the capacity of elements C—1 to C—6 to be of such value so that a predetermined number of received impulses are necessary before the individual capacity elements are effective to discharge and overcome the individual grid bias impressed upon the grid control elements of the tubes A—1 to A—6. It is seen that immediately upon receipt of the first synchronizing impulses that the power supply is instantly generated by the oscillator circuit arrangement and impressed upon the phase transforming means so that control of the signal receiving channels is immediately established; and since the synchronizing signals are the only signals being received at this time and since the channel including the device R—8 is the only channel in phase with the incoming synchronizing signals, consequently receipt of these signals is no longer effective to render the remaining signaling channels conductive.

In order to describe briefly how the individual signaling channels may be rendered conductive for signaling control purposes assume that the signal initiating means 12 at the transmitting station associated with the signaling channel including the device T—1 is operated thereby initiating a series of particularly timed impulses which are impressed upon the transmission medium. It is understood that the character signals initiated and generated thereby are impressed upon the transmission medium in addition to the periodically timed synchronizing impulses which are continuously generated by the synchronizing channel including the device T—8. The continuously initiated synchronizing impulses are effective at all times to control the synchronizing channel at the receiver thereby controlling the generation of the power supply thereat which is impressed upon the phase transforming means and which in turn is effective to control the segregation of the timed character signals which are initiated and generated aperiodically upon operation of the different signal initialing means 12. Continuing now with the example, the character signals generated by the signaling channel including the device T—1 are impressed upon the signal receiving means 45 to render the control tube 44 conductive, at these particular intervals, thus permitting current to flow in the following circuit: from the positive terminal of the potential source F, to anode and cathode elements of tube 44, conductor 46, anode and cathode elements of device R—1, condenser C—1 and resistor L—1 to the negative terminal of the said source. Upon energization of the described circuit by the series of character impulses impressed thereon, the condenser C—1 is charged by a predetermined number of the said series of impulses, which charge leaks off through the resistor L—1 impressing a relatively long continuous impulse on the grid of tube A—1, reducing the bias on the grid element thereby rendering the tube conductive and permitting current to flow in the output circuit of tube A—1 including the signal indicating control means 13. It is seen that the said signal indicating control means is energized as long as the signal initiating means 12 associated with the device T—1 is operated. It is understood from the description just set forth that the remaining signaling channels including the devices R—2 to R—6 are not rendered conductive at the time that the character signals are received which are generated by the signal initiating means associated with the first signaling channel including the device T—1.

It is evident now that the conditioning of the remaining signaling channels including the said devices R—2 to R—6 is such that these remaining channels are not adapted to be rendered conductive at the same timed intervals the said character signals, initiated by the device T—1, are received. It is seen that the signaling channel, at the receiving station, associated with the output circuit of phase 1 of the phase transforming means is conditioned so that the conductivity of this channel is controlled in synchronism with the conditioning of the signaling channel associated with the output circuit of phase 1 of the phase transforming means at the transmitting station. Similarly the signaling channels at the receiver associated with the remaining phases 2 to 8 of the phase transforming means are conditioned in synchronism with the signaling channels at the transmitting station associated with the phases 2 to 8 of the transforming means thereat. Referring to Fig. 14 the timing arrangement of the different controlled circuits is graphically shown, the impulses for each phase representing the times at which the individual channels at both stations associated with each of the phases are conditioned to control the conductivity of each of the channels. It is seen that each channel is conditioned periodically and cyclically and that the conditioning of the corresponding channels occurs at mutually exclusive timed intervals. It is evident then that the individual signaling channels at the receiving station associated with the different phase output circuits are adapted to be responsive solely to the signals initiated by the individual transmitting signaling channels associated with the output circuits of the corresponding phases of the phase transforming means at the transmitting station.

It is seen, therefore, that the periodic and continuous initiation of the timed synchronizing signals are effective to control the energization of the controlling oscillation generators at both the transmitting and receiving stations, which oscillations are effective to control the synchronous conditioning of the signaling channels at both stations, whereby, the signaling channel controlling means can be operated singly or in various code combinations for initiating timed character signals which, in turn, are segregated by the signaling channels at the receiver and upon segregation thereof the said receiving signaling channels are rendered conductive to control the associated indicating control means accordingly.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A signaling system comprising a transmitting and receiving station, a series of normally non-conductive signaling channels at both stations, means comprising an oscillation generating system for conditioning each of the said series of channels periodically and cyclically at mutually exclusive intervals to control the conductivity of the individual channels, means cooperating with the said channels at the transmitting station for rendering the channels conductive to initiate both aperiodic and periodic control signals, means responsive to the periodic signals for controlling the said oscillation generating systems for sustaining further operation thereof for conditioning the associated channels, and means cooperating with the series of channels at the receiving station responsive to the aperiodic signals for segregating the signals including means for rendering the corresponding channels conductive for control purposes.

2. A signaling system comprising a transmitting and receiving station, a series of normally non-conductive signaling channels at both stations, means comprising an electron tube oscillator system for generating oscillations of a predetermined frequency including means for utilizing the oscillations for conditioning each of the said series of channels periodically and cyclically at mutually exclusive intervals to control the conductivity of the individual channels, means cooperating with the said channels at the transmitting station for rendering the channels conductive to initiate both aperiodic and periodic control signals, means responsive to the periodic signals for controlling the electron tube oscillator systems for sustaining further operation thereof for conditioning the associated channels, and means cooperating with the series of channels at the receiving station responsive to the aperiodic signals for segregating the signals including means for rendering the corresponding channels conductive for control purposes.

3. A signaling system comprising a transmitting and receiving station, a series of signaling channels at both stations, each channel including a normally non-conductive electric discharge device, means comprising an electron tube oscillator system for generating oscillations of a predetermined frequency including means for utilizing the oscillations for conditioning each of said series of channels periodically and cyclically at mutually exclusive intervals to control the conductivity of the associated discharge devices, means cooperating with the said channels at the transmitting station for rendering the associated devices conductive to initiate both aperiodic and periodic control signals, means responsive to the periodic signals for controlling the said oscillator systems for sustaining further operation thereof for conditioning the associated channels and devices, and means cooperating with the series of channels at the receiving station responsive to the aperiodic signals for segregating the signals including means for rendering the corresponding devices conductive for control purposes.

4. A signaling system comprising a transmitting and receiving station, a series of normally non-conductive signaling channels at each station, means comprising oscillation generating systems for generating oscillations of a predetermined frequency including means for utilizing the oscillations for conditioning each of said series of channels periodically and cyclically at mutually exclusive intervals to control the conductivity of the said channels, means cooperating with the channels at the transmitting station for rendering certain of them conductive at aperiodic intervals for initiating control signals and means cooperating with one of the channels thereat for rendering the last mentioned channel conductive periodically and continuously for initiating synchronizing control signals, means responsive to the synchronizing signals at both stations for controlling the said oscillation generating systems for sustaining further operation thereof for conditioning the associated channels, and means cooperating with the series of channels conditioned at the receiving station responsive to the aperiodic control signals for segregating the signals including means for rendering the corresponding channels conductive for control purposes.

5. A signaling system comprising a transmitting and receiving station, a plurality of normally non-conductive signaling channels at each station and means at each station comprising means for generating a power supply for conditioning the signaling channels thereat periodically and cyclically at mutually exclusive intervals for controlling the conductivity thereof, means for rendering the channels at the receiving station conductive aperiodically for initiating control signals, a synchronizing control channel at each station, means for rendering the last mentioned channel conductive for continuously transmitting a series of synchronizing signals, means at the transmitting station responsive to the synchronizing signals including means for controlling the power supply generating means thereat to sustain further operation of the generating means, means at the receiving station responsive to the synchronizing signals including means for rendering the synchronizing control channel thereat conductive, means controlled by the last mentioned channel for controlling the associated power supply generating means at the receiving station to sustain further operation thereof, and means responsive to the said aperiodic signals including means for rendering the conditioned channels at the receiving station conductive in accordance with the signals.

6. A signaling system comprising a transmitting and a receiving station, a plurality of normally non-conductive signaling channels at each station and means at each station for conditioning the said signaling channels thereat periodically and cyclically at mutually exclusive intervals for controlling the conductivity thereof, means at the transmitting station for rendering the channels conductive aperiodically and selectively to initiate control signals, means at the receiving station responsive to the control signals including means for rendering certain of the conditioned channels thereat conductive in accordance with the signals, means at the transmitting station for initiating synchronizing signals and individual means at both stations controlled by the synchronizing signals including means for controlling the corresponding channel conditioning means thereat to sustain further operation of the said channel conditioning means.

7. A signaling system comprising a transmitting and receiving station, a plurality of normally non-conductive signaling channels at each station, and means at each station comprising a fluctuating power supply generating means including means for conditioning the said signaling channels thereat periodically and cyclically at mutually exclusive intervals for controlling the conductivity thereof, means at the transmitting station for rendering the channels conductive thereat including means for initiating control signals whenever the channels are rendered conductive, means at the receiving station responsive to the signals for rendering the conditioned channels thereat conductive including means for segregating the signals for control purposes, means at the transmitting station for initiating synchronizing signals, and individual means at both stations controlled by the synchronizing signals including means for controlling the corresponding fluctuating power supply generating means to sustain further operation thereof and conditioning of the associated channels.

17. A signaling system comprising a plurality of normally non-conductive signaling channels, means for conditioning the channels periodically and cyclically for controlling the conductivity thereof, means for rendering certain of the channels conductive aperiodically including means for initiating control signals when the said channels are rendered conductive, means for rendering another of said channels conductive continuously at periodic intervals for initiating synchronizing signals, and means responsive to the synchronizing signals including means for controlling the channel conditioning means.

9. A signaling system comprising a plurality of normally non-conductive signaling channels, means for generating a fluctuating power supply including means for utilizing the said supply for conditioning the channels periodically and cyclically for controlling the conductivity thereof, means for rendering certain of the channels conductive aperiodically including means for initiating control signals when the said channels are rendered conductive, means for rendering another of said channels conductive continuously at periodic intervals for initiating synchronizing signals, and means responsive to the synchronizing signals including means for controlling the said power supply generating means to sustain further operation thereof and conditioning of the said channels.

10. The method of signaling which comprises initiating timed control and synchronizing signals at a transmitting station by rendering conductive signaling channels thereat which are conditioned periodically and cyclically for controlling the conductivity thereof, and then at a receiving station impressing the signals upon signaling channels thereat which are conditioned cyclically, periodically and in synchronism with the incoming signals for segregating them, utilizing the control signals at the receiving station for control purposes, and utilizing the synchronizing signals at both stations for controlling the condition of the associated signaling channels thereat.

11. The method of signaling which comprises conditioning signaling and synchronizing channels at transmitting and receiving stations periodically and cyclically at mutually exclusive intervals thereby controlling the conductivity thereof, and at the transmitting station rendering the signaling channels conductive selectively and aperiodically for initiating control signals and the synchronizing channel conductive periodically for initiating synchronizing signals, utilizing the control signals for rendering the signaling channels at the receiving station conductive for segregating the said signals for control purposes, and utilizing the synchronizing signals first at the transmitting station for controlling the conditioning of the said channels thereat and second at the receiving station for rendering the synchronizing channel thereat conductive for controlling the conditioning of the said channels thereat.

12. The method of signaling which comprises conditioning a plurality of normally non-conductive signaling and synchronizing channels at a station periodically and cyclically for controlling the conductivity thereof, rendering the signaling channels conductive for initiating timed control signals aperiodically for control purposes and rendering the synchronizing channel conductive for initiating timed synchronizing signals periodically, and utilizing the synchronizing signals thereat for controlling the conditioning of the said channels.

CLYDE J. FITCH.